United States Patent [19]

Itoh

[11] 4,446,486
[45] May 1, 1984

[54] IMAGE SIGNAL PROCESSING CIRCUIT

[75] Inventor: Satoru Itoh, Kanagawa, Japan

[73] Assignee: Fuji Xerox Co., Ltd., Tokyo, Japan

[21] Appl. No.: 357,129

[22] Filed: Mar. 11, 1982

[30] Foreign Application Priority Data

Mar. 13, 1981 [JP] Japan .................................. 56-35401

[51] Int. Cl.³ .............................................. H04N 1/40
[52] U.S. Cl. .................................... 358/280; 307/351;
   307/358; 328/151; 358/263; 358/282; 358/284;
   382/53
[58] Field of Search ............... 358/280, 282, 284, 263;
   235/455; 382/53; 307/351, 356, 358; 328/151,
   164

[56] References Cited

U.S. PATENT DOCUMENTS 3,723,649  3/1973  Pitegoff et al. ..................... 358/282
3,869,698  3/1975  Trost et al. ............................ 382/53

FOREIGN PATENT DOCUMENTS 56-6523  1/1981  Japan .................................. 358/280

Primary Examiner—Joseph A. Orsino, Jr.
Attorney, Agent, or Firm—Sughrue, Mion, Zinn, Macpeak and Seas

[57] ABSTRACT

An image signal processing circuit for use in a copying device or the like includes maximum/minimum detection and hold circuits which together output signals approximating an envelope of the white and black levels of the image signal. The envelope thus formed is divided at a predetermined proportion and the divided signal is used as a threshold value for conversion of the image signal into binary form.

4 Claims, 14 Drawing Figures

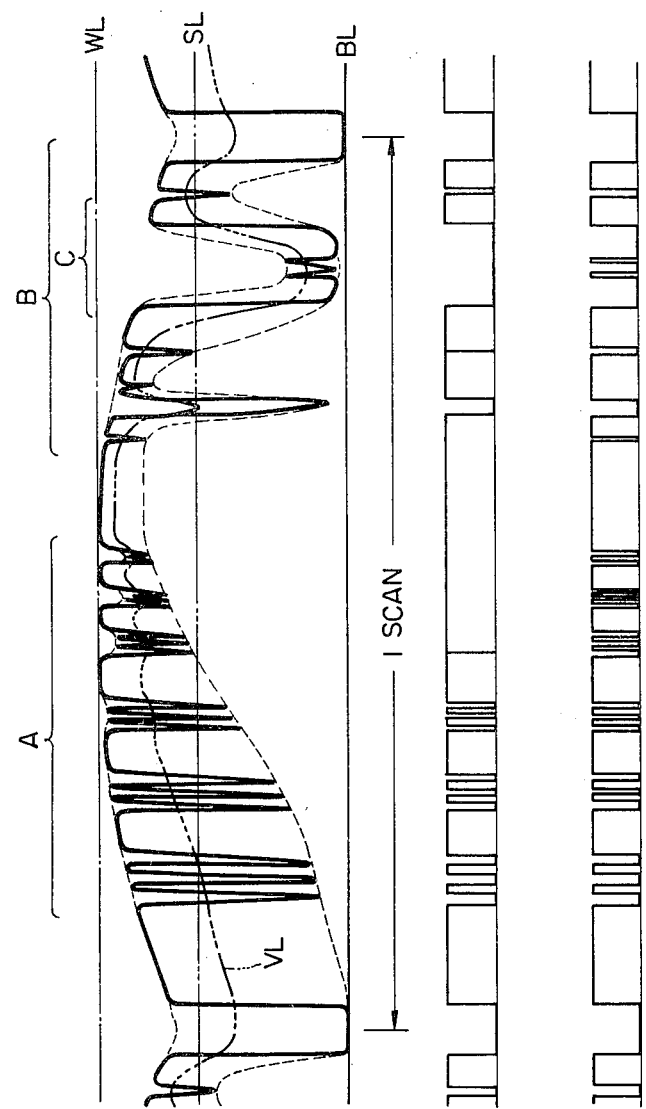

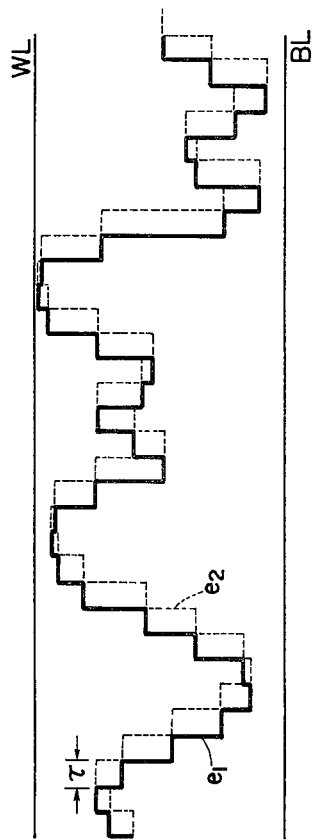
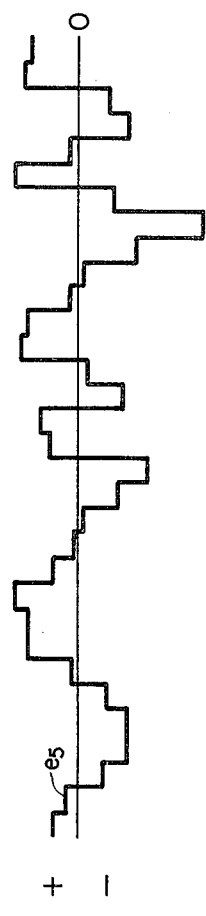
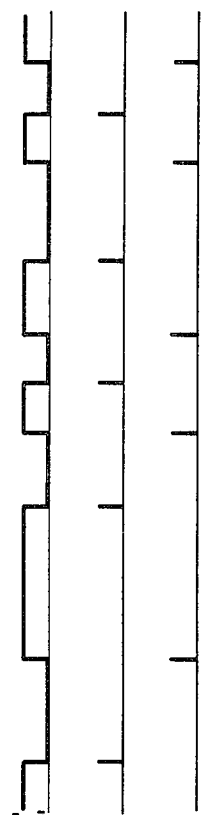
FIG. 4(A)
FIG. 4(B)
FIG. 4(C)
FIG. 4(D)
FIG. 4(E)

IMAGE SIGNAL PROCESSING CIRCUIT

BACKGROUND OF THE INVENTION

This invention relates to an image signal processing circuit for optically reading documents, pictures, etc., converting the thus detected optical signal into an electrical signal, and then processing the same to obtain a binary signal representing white (a background portion) or black (information such as characters or pictures) color.

FIG. 1(A) shows a typical example of an electric signal obtained by optically reading an original such as a document or picture. In the drawing, the solid line waveform represents a read-out signal for one scanning line including a resolution pattern section A and a document/picture section B. Also in the figure, BL denotes a black level and WL denotes a white level.

When obtaining white/black binary signals from such a read-out signal, heretofore a fixed threshold level SL was preset, and the white/black binary signals as illustrated in FIG. 1(B) were output in response to whether the read-out signal was higher or lower than a certain voltage (or current) level corresponding to the threshold level SL.

However, where the fixed threshold level SL is used, if image density is increased as shown in the resolution pattern section A, for example, the difference between the white and black level is reduced and the read-out signal has a tendency to rise up toward the white level WL as a whole, as is apparent from FIG. 1(A), thus resulting in a fear that it may become impossible to resolve the image through processing into the white/black binary signals, even if white and black colors can be correctly discriminated on the read-out image signal (or the image can be resolved optically).

Moreover, as is seen from a section C of the document/picture section B of FIG. 1(A), when reading a narrow white line on a black background, the read-out signal approaches the black level BL, resulting in that the narrow white line cannot be resolved.

As a result, in the conventional binary circuit using the fixed threshold value, there is a large difference in the amount of information in the input image signal as opposed to the output image signal.

FIG. 1(B) illustrates binary signals which were obtained by processing the read-out signal of FIG. 1(A) by use of the fixed threshold SL. It is seen from FIG. 1(B) that some information was lost in both sections A and C, thus resulting in poor resolution.

FIG. 2(A) illustrates a read-out signal which was obtained by sampling outputs from a one-dimensional image sensor such as a CCD along the scanning direction, and digitizing the sampled output. When the read-out signal is processed to form binary signals by use of the fixed threshold level SL, there are obtained binary signals as shown in FIG. 2(B). Hatched portions in FIG. 2(B) indicate the fact that the level of the read-out signal fluctuates in the vicinity of the threshold value, and hence the binary signals come to have a white-and-black "striped" form. It will be understood that a black portion is narrowed in section A, and a white portion is lost in section B, in the process illustrated in FIGS. 2(A) and (B).

SUMMARY OF THE INVENTION

This invention operates to vary the threshold value in response to a white level (the maximum value) and a black level (the minimum value) of an image signal for the purpose of preventing a loss of information due to conversion into binary representation, which loss has often been experienced in the prior art, as mentioned above.

BRIEF DESCRIPTION OF THE DRAWINGS

FIGS. 1A–1C and 2A and 2B are wave forms showing a read-out image signal and the corresponding binary signals, according to the prior art;

FIGS. 4(A)–4(H) are timing charts for explaining the operation of the circuit of FIG. 3.

DETAILED DESCRIPTION OF THE PREFERRED EMBODIMENTS

Figures 2A, 2B:
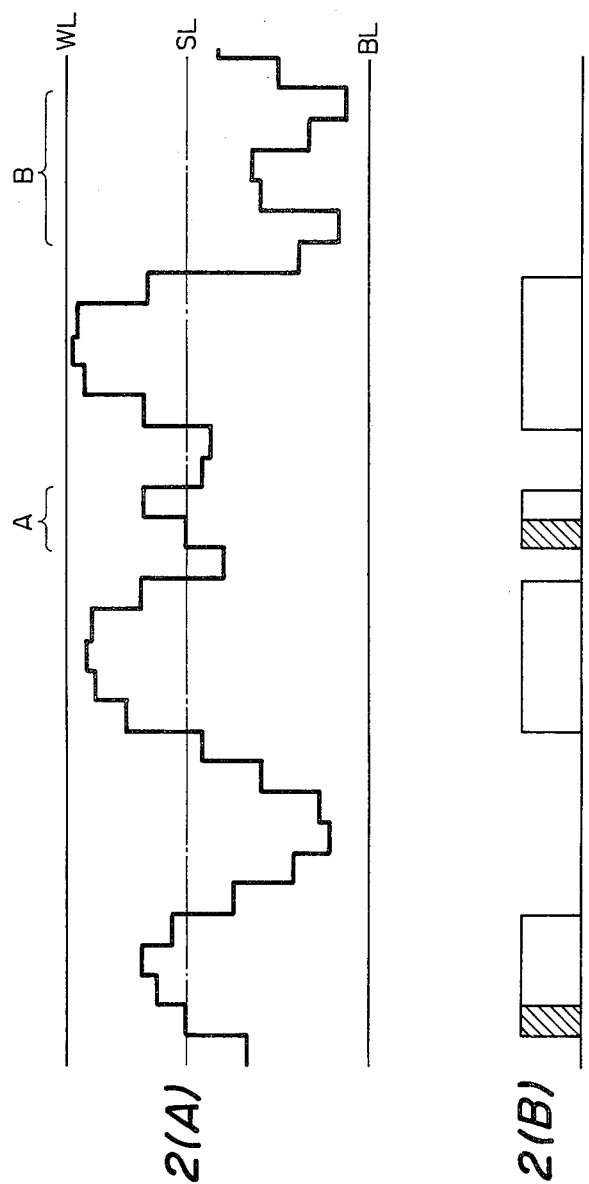
Figure 3:
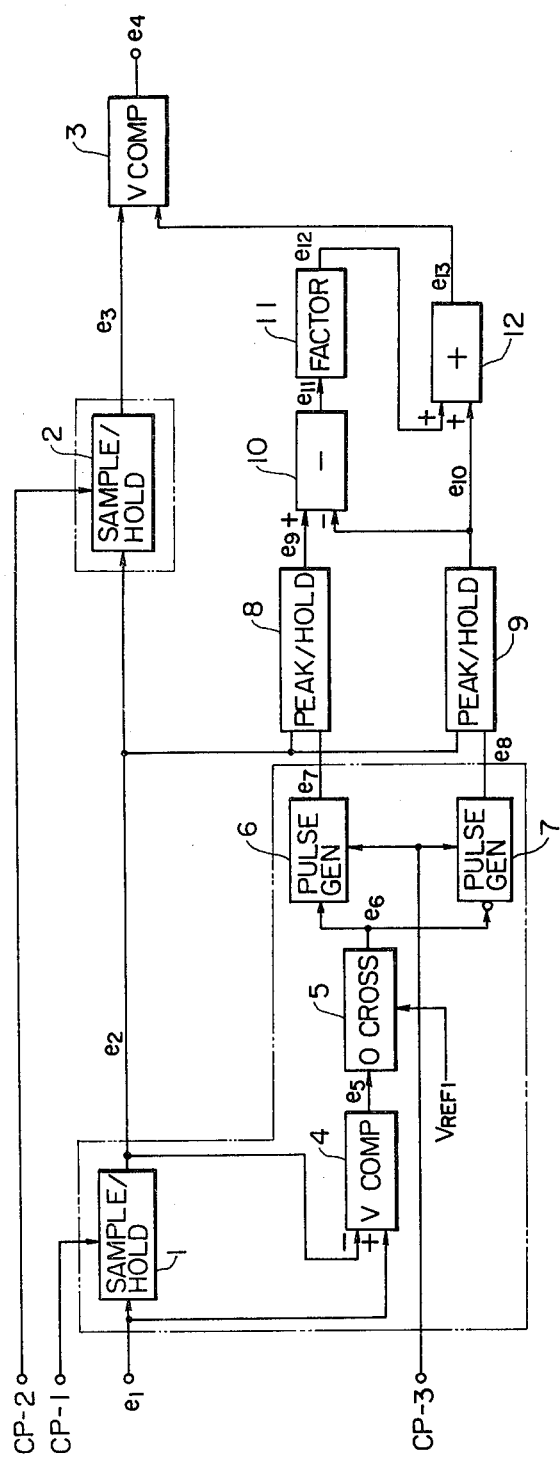
FIG. 3 is a block diagram of an image signal processing circuit according to one embodiment of this invention.

FIG. 3 shows a block diagram according to an embodiment of this invention, and FIG. 4 shows waveforms of signals appearing at respective sections. Referring to FIG. 3, designated at 1,2 are sample/hold circuits, 3 is a voltage comparator, 4,10 are subtraction circuits, 5 is a zero-crossing detection circuit, 6,7 are pulse generation circuits, 8,9 are peak/hold circuits, 11 is a factor circuit, 12 is an addition circuit, and CP1-CP3 are clock pulses.

In FIG. 3, the input signal e1 is an image signal output from a one-dimensional image sensor such as a CCD or a photodiode array, the image signal having been sampled along the scanning direction beforehand. The input signal e1 undergoes sample/holding in the sample/hold circuit 1 (referred to as S/H-1 hereinafter) with the timing of the clock pulse CP-1. Consequently, the output e2 from the S/H-1 is delayed by the period $\tau$ of the clock pulse CP-1 (FIG. 4(A)).

Both the input and output signals of the S/H-1 are input to the subtraction circuit 4, respectively; and the difference therebetween is obtained as output e5 (FIG. 4(B)). Assuming that a time series function for the input signal e1 is e(t), e5 is given by g(t) as represented by Equation (1).

$$g(t) = e(t) - e(t - \tau) \tag{1}$$

The signal e5 is input to the zero-crossing detection circuit 5 which in turn issues an output e6 satisfying the following Equations (2) and (3) (FIGS. 4(c)).

$$\text{If } g(t) > 0 \; e6 = 1 \text{ (logic level)} \tag{2}$$

$$\text{If } g(t) \leq 0 \; e6 = 0 \text{ (logic level)} \tag{3}$$

The output e6 is input to both pulse generation circuits 6 and 7.

When the signal e6 is changed from the logical level "1" to "0", the pulse generation circuit 6 issues a pulse signal e7 synchronously with the clock pulse CP-3 (FIG. 4(D)). When the signal e6 is changed from the logic level "0" to "1", the pulse generation circuit 7 issues a pulse signal e8 synchronously with the clock pulse CP-3 (FIG. 4(E)).

As seen from a comparison of FIGS. 4(A), 4(D) and 4(E), the pulse signals e7 and e8 are generated whenever the input signal e1 comes to have maximum and minimum values, respectively. Therefore, the peak/hold circuits 8 and 9 (referred to as P/H-8, P/H-9 hereinafter) hold the peak values of the signal e2 in response to the pulse signals e7, e8.

Figure 4F:
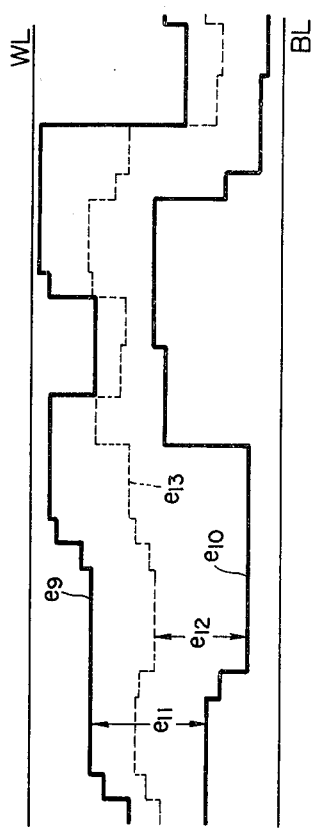
Figure 4G:
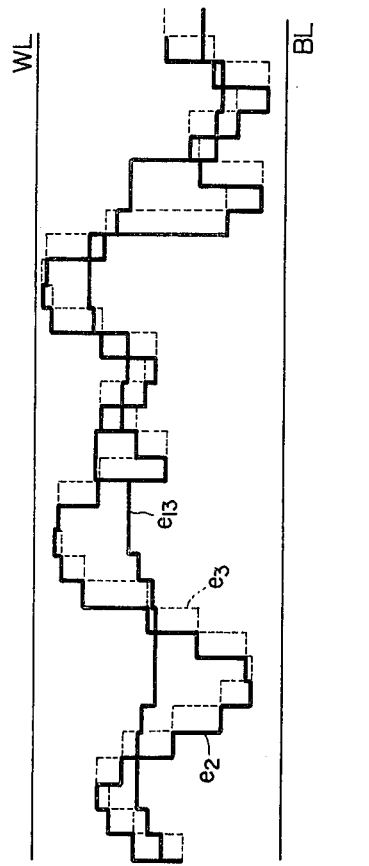
Figure 4H:

As a result, the output signal e9 of the P/H-8 approximates an envelope of the white level, while the output signal e10 approximates an envelope of the black level (FIG. 4(F)). In the subtraction circuit 10, the black level envelope e10 is subtracted from the white level envelope e9 and a difference signal e11 between the white and black levels is output therefrom.

The factor circuit 11 serves as a circuit for setting the threshold value for binary representation, and outputs a voltage e12 which is obtained by multiplying the difference signal e11 by a prearranged factor. The signal e12 is added to the black level envelope signal e10 in the addition circuit 12, which in turn outputs a threshold value level signal e13 for binary representation (FIG. 4(F)).

The sample/hold circuit 2 (referred to as S/H-2 hereinafter) operates as a delay circuit correcting for a delay time of the processing circuit group as mentioned above, in outputting the threshold value signal e13 for binary representation, and issues a signal e3. This signal e3 is compared with the threshold value signal e13 by the voltage comparator 3 (FIG. 4(G)), which in turn outputs binary signals e4 FIG. 4(H)).

The signal e13 always indicates a value which allows the distance between the white and black envelopes to be divided at a certain proportion through the foregoing processes. Therefore, it becomes possible to minimize the degree of white or black information loss by converting the signal e3 into binary signals with the signal e13 being used as the threshold value.

Although the input signal e1 is obtained as an output from a one-dimensional image sensor such as a CCD or a photo diode array in the embodiment as described above, the invention may also be applied to a case, where, as illustrated in FIG. 1, the input signal e1 is an analog signal obtained by forming predetermined reading apertures and scanning (for instance, in the combination of a flying spot scanner tube and a photomultiplier or a laser beam spot and a photomultiplier).

In this case, assuming that the input signal e1 has a maximum image signal frequency $1/\eta p$, the foregoing S/H-1, S/H-2 are replaced by analog delay circuits, each having a delay time less than $\eta p/2$, in the image signal processing circuit as described above.

With such an arrangement, the threshold value varies following the white and black level envelope of the read-out signal, as shown by the chain line VL in FIG. 1(A). Thus, it becomes possible to obtain binary signals with no loss of information, as illustrated in FIG. 1(C), by processing the read-out signal for binary representation using the variable threshold value.

What is claimed is:

1. An image signal processing circuit comprising:
   first delaying means for delaying an input image signal for a first predetermined time period;
   first comparing means for comparing said input image signal and a delayed signal provided at an output of said first delaying means for producing a binary signal having a first state when said input image signal has a level above a level of said delayed signal and a second state when said input image signal has a level below a level of said delayed signal;
   first and second pulse generating means, operating in response to said binary signal, for producing pulses when said binary signal changes from first state to said second state and from said second state to said first state, respectively;
   first and second means for holding a predetermined one of said input image signal and said delayed signal in response to said first and second pulse signals respectively;
   means for providing a difference signal representing a difference between outputs of said first and second holding means, respectively;
   means for scaling said difference signal by a predetermined scale factor; and
   second comparing means, operating in response to said difference signal and a predetermined one of said input image signal and said delayed signal, for producing a binary output image signal in response thereto.

2. The image signal processing circuit of claim 1, further comprising means for summing said difference signal with said output of said second holding means to provide a comparison signal, said comparison signal being applied to one input of said second comparing means.

3. The image signal processing circuit of claim 2, further comprising second delaying means interposed between said output of said first delaying means and a second input of said second comparing means.

4. The image signal processing circuit of claim 3, wherein said first comparing means comprises subtracting means receiving as inputs said input image signal and said delayed signal, and a zero-crossing detector having an input coupled to an output of said subtracting means.

* * * * *